United States Patent
Lind

(10) Patent No.: US 8,453,608 B2
(45) Date of Patent: Jun. 4, 2013

(54) BUOYANT TOY

(75) Inventor: Ekard Lind, Mettersdorf (AT)

(73) Assignee: Steve O. Gleitsmann, San Jose, CA (US)

( * ) Notice: Subject to any disclaimer, the term of this patent is extended or adjusted under 35 U.S.C. 154(b) by 69 days.

(21) Appl. No.: 12/403,241

(22) Filed: Mar. 12, 2009

(65) Prior Publication Data

US 2009/0229535 A1 Sep. 17, 2009

(30) Foreign Application Priority Data

Mar. 12, 2008 (DE) .......................... 10 2008 013 937

(51) Int. Cl.
*A01K 29/00* (2006.01)

(52) U.S. Cl.
USPC .......................................... 119/707

(58) Field of Classification Search
USPC ... 119/702, 707, 709–711; 446/153; 472/128; 441/6, 44, 46; 273/350
See application file for complete search history.

(56) References Cited

U.S. PATENT DOCUMENTS

| | | | |
|---|---|---|---|
| 2,703,469 A * | 3/1955 | Raizen .......................... | 446/153 |
| 3,360,811 A * | 1/1968 | Bartlebaugh ..................... | 441/6 |
| 3,760,441 A | 9/1973 | Handelman | |
| 3,830,202 A | 8/1974 | Garrison | |
| 4,302,003 A * | 11/1981 | Hughes .......................... | 472/129 |
| 4,515,572 A * | 5/1985 | Emms ............................ | 446/153 |
| 4,622,019 A * | 11/1986 | Katzman et al. ................ | 446/153 |
| 5,116,275 A * | 5/1992 | Sassak ............................ | 446/48 |
| 5,505,645 A | 4/1996 | Engler, Jr. | |
| 5,593,331 A * | 1/1997 | Duren ............................ | 441/6 |
| 5,928,053 A * | 7/1999 | Henderson ..................... | 446/153 |
| 5,980,259 A | 11/1999 | Witmer | |
| 6,332,822 B2 | 12/2001 | Greenberg | |
| 7,258,836 B2 * | 8/2007 | Hill et al. ........................ | 422/50 |
| 7,424,866 B1 * | 9/2008 | Tsengas ......................... | 119/707 |
| 7,850,505 B2 | 12/2010 | Wong | |
| 2006/0201446 A1 * | 9/2006 | Edwards ........................ | 119/707 |
| 2009/0277395 A1 * | 11/2009 | Jager ............................ | 119/707 |
| 2010/0064983 A1 * | 3/2010 | Ritchey et al. ................. | 119/707 |

FOREIGN PATENT DOCUMENTS

| | | |
|---|---|---|
| DE | 829077 C1 | 1/1952 |
| DE | 69812090 T2 | 4/2003 |
| WO | WO9109657 A1 | 7/1991 |

* cited by examiner

*Primary Examiner* — Kristen C Hayes
(74) *Attorney, Agent, or Firm* — Ash Tankha; Lipton, Weinberger & Husick

(57) ABSTRACT

A buoyant motivational object used to play with a dog or child. While afloat, the motivational object comprises of an above-water section located above the surface of the water and an underwater section located below the surface of the water, and it is comprised of a base body with at least one biting or gripping area shaped for pick-up by a dog's muzzle or a human hand, and the biting or gripping area is at least partially located in the above-water section while the balance or gravity point of the motivational object is located in the underwater section.

10 Claims, 9 Drawing Sheets

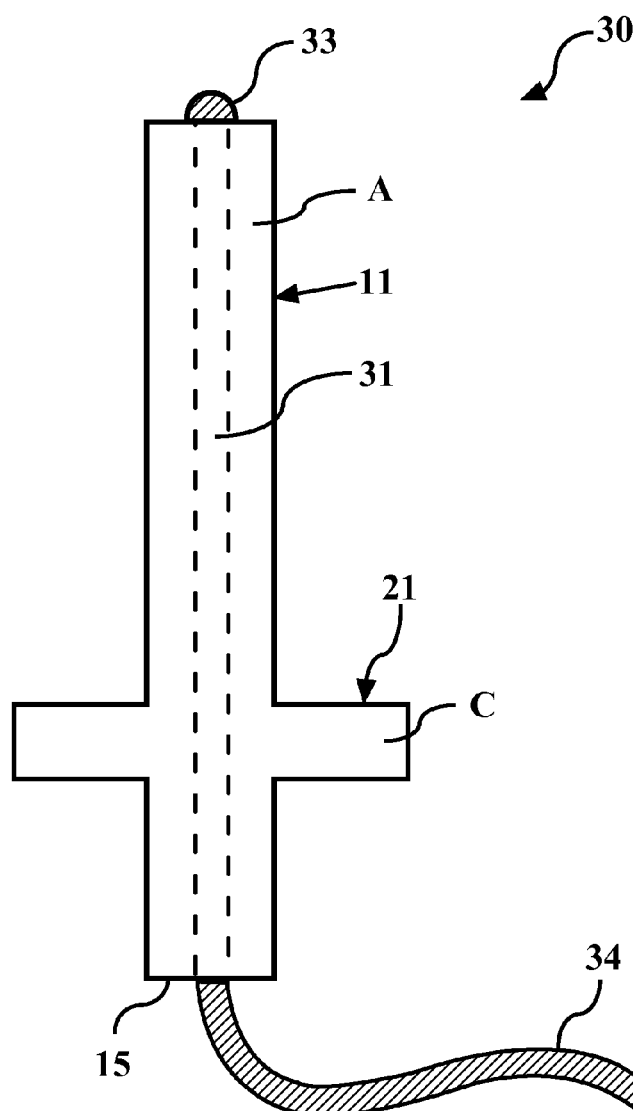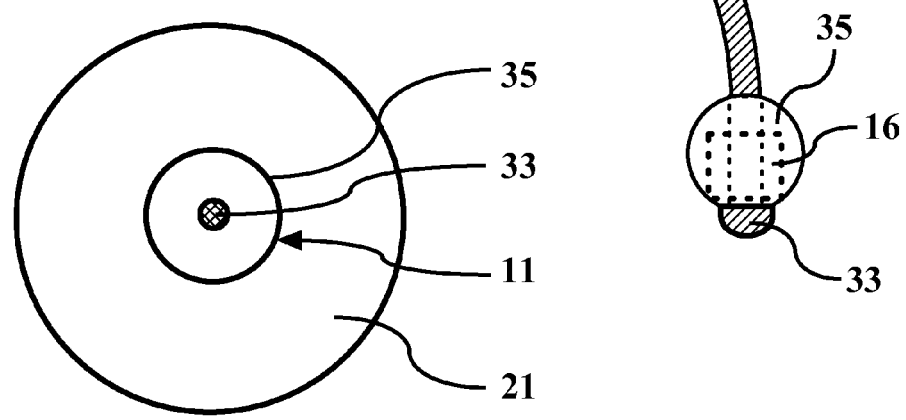
Fig. 3
Fig. 3a

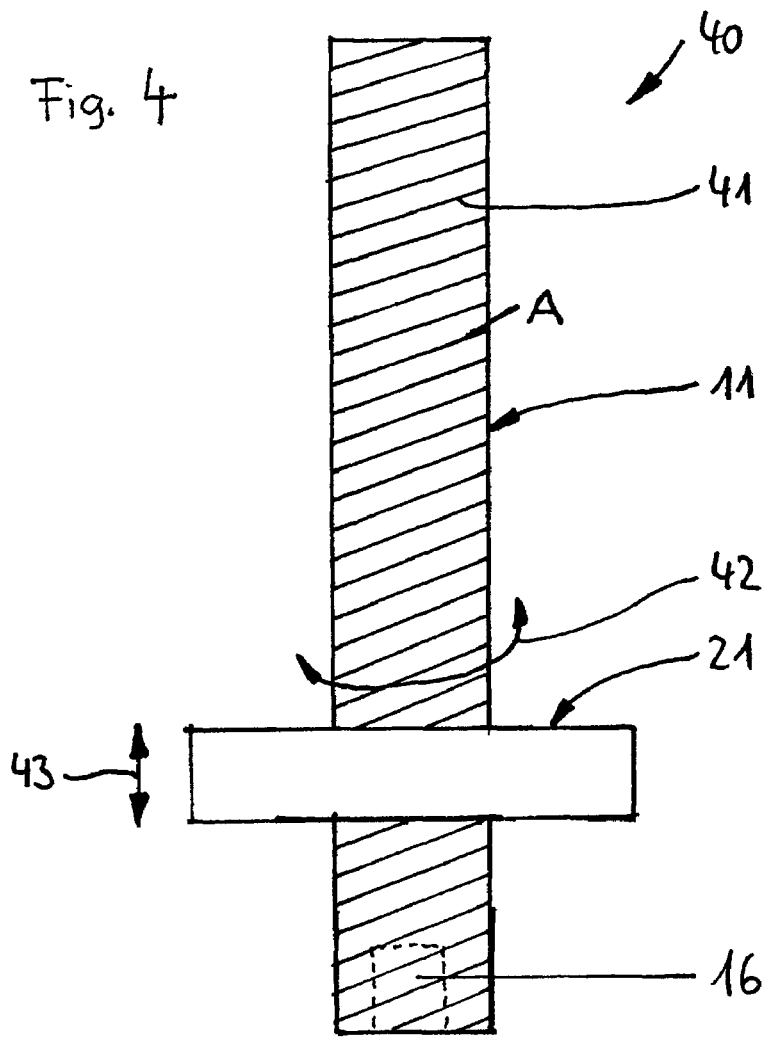

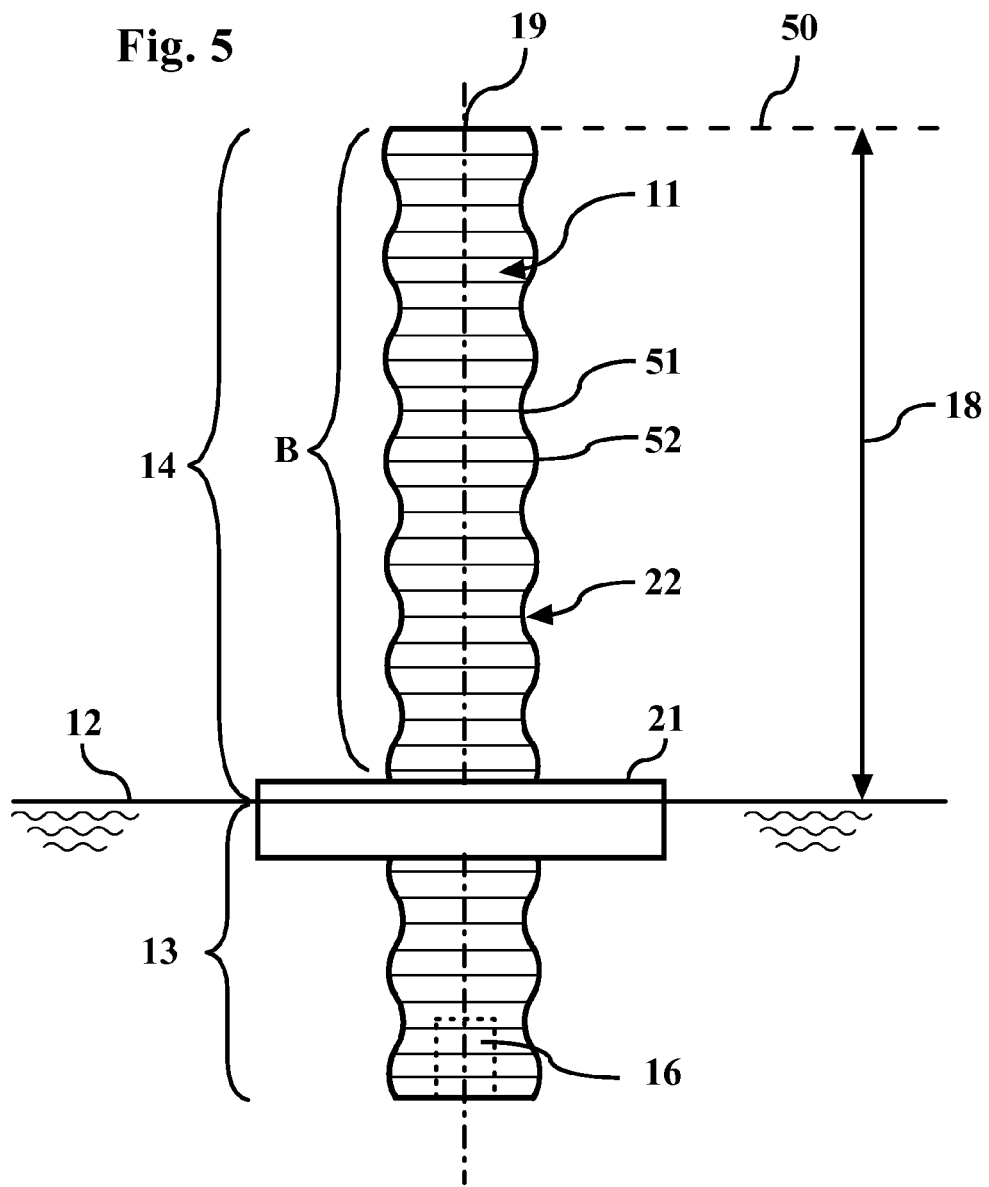

BUOYANT TOY

CROSS-REFERENCE TO RELATED APPLICATION

This application claims priority to German Patent Application No. 10 2008 013 937.8-23, filed Mar. 12, 2008.

TECHNICAL FIELD

This invention relates to animal training devices, and more specifically to buoyant animal training devices.

BACKGROUND

Buoyant motivational objects or toys have been known for many years. They are used in a great variety of water games that are played with children and dogs alike. They also play an important role in the training of working dogs for hunting or even search and rescue. One example of a buoyant motivational object is the "dog training device" described in German patent DE 103 23 763 A1. This device consists of a floating body in the form of an ellipsoid that has a consistency less dense than water. Each of the two opposite longitudinal ends of the device has a rope with a spherical weight on its outer end attached to it. The spherical weights ensure that the floating dog training device always lies flat in the water with its central axis parallel to the horizontal water-surface. The shape and floatation of this dog training device is intended to encourage a hunting dog to grasp the device in the middle which is desirable when teaching a dog how to correctly retrieve (e.g., a hunted duck from the water). If the dog would grasp the device on one of the outer ends, the weights would make retrieval of the device more difficult both in water and on land. In addition, the particular geometry of the aforementioned dog hunting device is intended to break the dog's habit of shaking its coat after leaving the water with the retrieved device. If the dog would follow its instinct to shake the remaining water of its coat, the weights attached to the ropes would impact against its head, muzzle or chest. To prevent this unpleasant sensation, the dog will learn to suppress its instinct to shake off until after the training device is released from the animal's mouth.

One drawback to this training device is the fact that it is difficult to identify by the dog while the object is in the water. The eyes of a swimming dog are only slightly above the surface of the water and this makes it rather difficult for the dog to detect the dog training device in its shallow floating position. Even with only slight waves in the water, the dog effectively loses sight of the training device. This often ends in the loss of an unrecovered device, which is both expensive and a very frustrating training experience for the dog.

In addition, there are many non-floating training objects that have been used. Examples include U.S. Pat. No. 3,830,202, DE 298 19 615 U1, or DE 299 17 816 U1. These non-floating objects exist in many different variations. They come in shapes and materials tailored to their particular purpose. Sometimes they are also made of materials with lower density than water to allow them to stay afloat in the water, even if that is not the primary purpose of that particular device. The devices illustrated in the above three references have a similar limitation; the objects may be difficult for a dog to recognize while the object is floating in the water. As a result, using this kind of device in or near water bears substantial risk device loss and a frustrating training experience for the dog.

SUMMARY

The challenge of designing a buoyant motivational object with good recognizability in the water is met by distributing the device's density so that a high-point of at least 4 cm, preferably at least 8 cm, more preferably of at least 10 cm above the surface of the water is created when the object is in a floating, static state. The elevated position of at least one point of the motivational object leads to a significantly improved visibility of the floating motivational object, even from the unfavorable visual angle of a swimming dog whose eyes are only a few centimeters above the surface of the water. Thus, the subject of the invention differs significantly from any prior art, in which motivational objects primarily made of heavy rubber or similar heavy plastics typically protrude only a few millimeters to a maximum of about 1 cm above the surface of the water. Also, by way of contrast, the high-points of familiar motivational objects made of synthetic, non-absorbent textile materials protrude to a maximum of about 2 cm above the surface of the water, and these motivational objects most commonly have a homogenous density distribution and a balance point that is located slightly above the surface of the water. The problem of insufficient recognizability could be solved by simply increasing the dimensions of the motivational object, i.e., by adding a sufficiently large ball or by using a larger ellipsoid with homogeneous density. Such solution however would render the motivational object useless since a single, large, voluminous and compact body lacks an adequate biting or gripping area and that makes it inappropriate as a motivational object or toy.

For purposes of the present application, t the thickness dimension of the biting or gripping area is less than 8 cm, preferably less than 6 cm, more preferably less than 4 cm. The density distribution according to the invention, which provides for a component of higher density in the underwater section of the motivational device, creates a self-erecting effect. When used in the water, the component with higher density drops underneath the surface of the water thereby erecting the lower density end of the motivational object to a high-point well above the surface of the water. This self erecting effect keeps the motivational object from tipping over, ensuring that its high-point remains visible to the swimming dog even under difficult conditions such as poor visibility or water having waves that would obscure the view of the dog. As the risk of loss of the motivational object decreases, the motivation for the dog increases. Another advantage of the invention's design is that the elevated high-point of the floating motivational object seesaws back and forth in the water which stimulates a dog's motion-oriented vision and thus its hunting drive far better than a prey substitute object that is barely moving.

A preferred form of the motivational object according to the invention comprises of an elongated base body with a longitudinal axis whereas the dimension of the body along the longitudinal axis is at least two, preferably at least three times greater than the base body's maximum dimension perpendicular to its longitudinal axis, whereas the longitudinal axis of the base body when in a floating, static state, is at an angle of at least 45°, preferably at least 60° with the horizontal surface of the water.

This preferred form utilizing an elongated base body results in enhanced recognizability in the water and it allows for a comfortable grasp of the object with a hand or a dog's muzzle well above the surface of the water, even if the motivational object is only partially erected.

Other conceivable versions of a motivational object according to the invention may include designs where the angle between the base body along its longitudinal axis and the horizontal surface of the water is deliberately kept out of equilibrium. This would result in an always "tilted" motivational object that floats at an angle not equal to 90° even in completely calm water conditions.

In a further refinement of the invention, the addition of a support body that is extending radially outward from the rod-shaped base body is proposed, wherein one part of it would be partially submerged while another part of it would be above the surface of the water when the motivational object floats. The surface of the water would divide the support body into two parts, one above-water section and an underwater section. This support body fulfills the function of a flotation device which provides an additional supporting force or a righting momentum around the balance point to guarantee an always erect position of the buoyant motivational object. An additional benefit of this design is added stabilization which helps the motivational object to quickly return to equilibrium even after exposure to strong interfering or displacing forces such as strong waves.

In another embodiment of the invention, at least one supporting body and the base body would be integrally combined for simple and cost efficient manufacturability. Alternatively, at least one support body could be detachable from the base body, providing the benefit of interchangeability between different types of supporting bodies with different floatation or displacement characteristics that alter the motivational devices' equilibrium. The same benefit of achieving variable floatation characteristics is also attained by providing for a number of different mounting positions in which the support body can be attached to the base body.

A particularly advantageous flotation characteristic is produced if the mean material density of the support body is lower than the mean material density of the base body, especially in the submerged area, and if the difference in density between base body and support body is at least 30% to 50%. In another embodiment of the present invention, the difference in density between base body and support body is at least 20% to 50%.

A preferred method of connecting a detachable support body to a base body is achieved by combining an elongated rod-like base body with a torus or disc-shaped support body. The latter can be clamped on and/or snapped on and/or by using a thread, screwed onto the base body. In this embodiment a design of a rotation-symmetric base body that has an outer surface with threads or a wave contour along its longitudinal axis could be used.

When using a ballast body attached to or integrated into the base body near the end of its submerged section, with such ballast body having a mean density greater than the mean density of the base body, especially if the ballast body's density is greater than 1, the base body exhibits an exceptionally stabile flotation behavior.

An example of an offset arrangement between a ballast body and a base body is a connection via rope that has the base body attached on one end and the ballast body on the other. The ballast body itself can be either entirely made of metal or preferably of a metallic core surrounded by an elastomeric coating, preferably from rubber which makes it easy and safe for a dog to pick up.

The base body should be made of rubber formed into a strong and rigid body as this provides the desired bite and grip characteristics. In contrast, it is desirable to manufacture the support body from lighter materials such as plastic foam material, preferably polyurethane foam.

Although there are many conceivable design possibilities for the motivational object according to the invention, notable implementations for the gripping or holding area above the surface of the water include rod, hook, shovel, bow and bar-shaped implementations.

BRIEF DESCRIPTION OF THE DRAWINGS

The drawings referenced below provide several examples of possible implementations of the invention: They show:

FIG. 3 is a side view of another alternative embodiment a buoyant motivational object having a rope attached to a ballast body.

FIG. 3a is a bottom view of the object in FIG. 3.

FIG. 4 is a side view of another embodiment having a support body screwed onto a threaded base body.

FIG. 4a top view of a support body split in peripheral direction.

FIG. 4b is a side view of the device of FIG. 4a.

FIG. 5 is a side view of another embodiment with a base body that has a wave-shaped surface and a support body clamped onto it.

DETAILED DESCRIPTION

Figure 1:
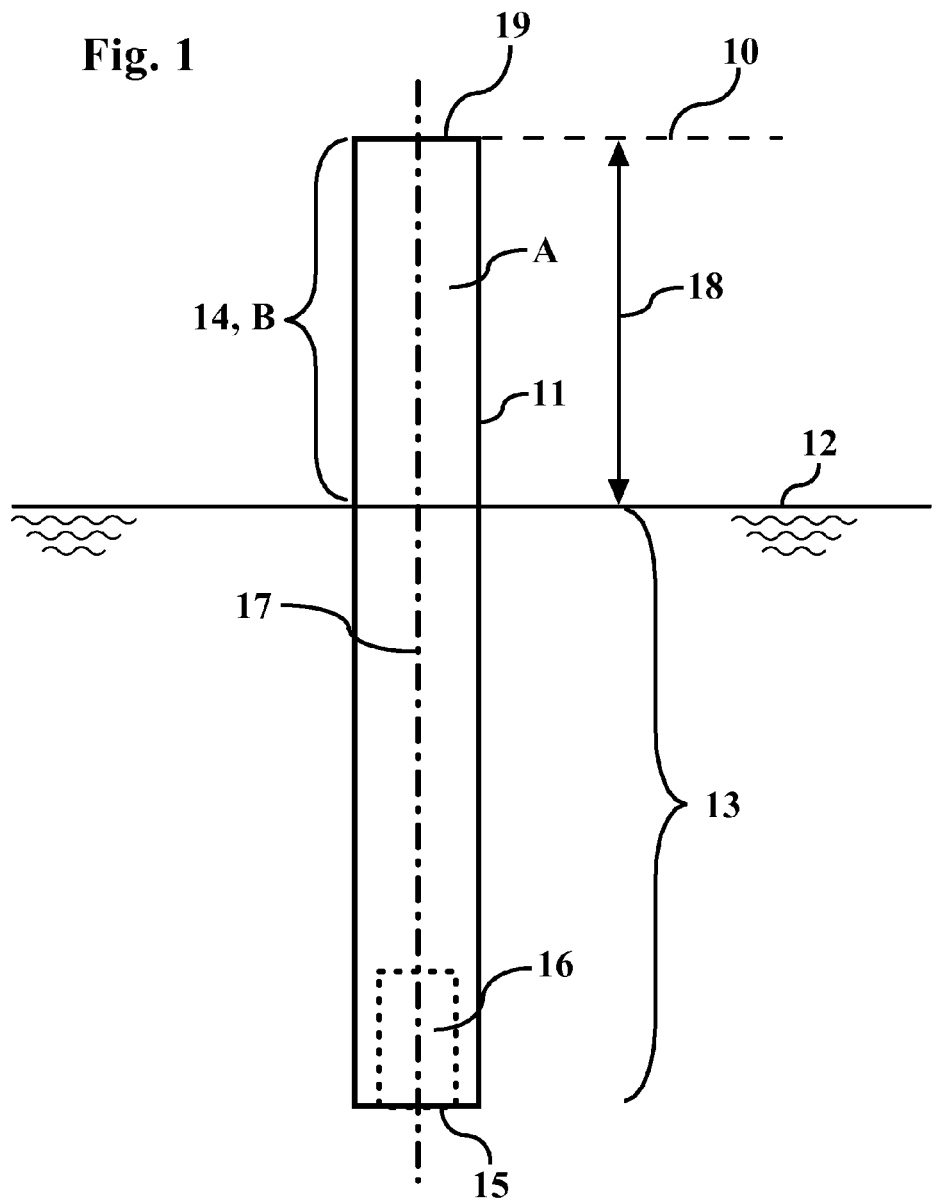
FIG. 1 is a side view of an embodiment of a buoyant motivational object shaped as a simple rod.

The implementation example in FIG. 1 shows a buoyant motivational object (10) in side view which consists of a base body (11) shaped like a cylinder with a circular, elliptical or rounded polygonal profile. FIG. 1 shows the motivational object in a floating, static state where it has completed any pendulum movements and, absent of any additional external interfering or displacing forces, has reached its equilibrium state. In this state, the underwater section (13) of the motivational object is below the surface of the water (12) while its above-water section (14) is above the surface of the water.

The motivational object (10) only assumes its equilibrium state shown in FIG. 1 because it incorporates a ballast body (16) embedded near the submerged end (15) of its base body (11). The ballast body (16) is also cylindrical and clamped into a cylindrical recess in the base body (11). While the base body (11) may consist of rubber which could further incorporate an inner air-cavity to ensure sufficiently low density, the ballast body would typically be made of metal such as lead, steel or zinc.

Due to the upright position of the base body (11) in the floating, static state, i.e., with the orientation of its longitudinal axis (17) in a direction perpendicular to that of the surface of the water (12), the distance (18) of the base body's high-point (19) above the surface of the water (12) is about three times larger than as if the base body (11) would not be equipped with the ballast body (16) which would result in the motivational object in FIG. 1 floating flat on the surface of the water. In the present case, the distance (18) is approximately 12 cm and the total length of the motivational object is about 30 cm. This means that the entire area of the base body (11) which extends above the surface of the water (12) would provide a biting or gripping area (B) for a dog or a child.

Figure 2:
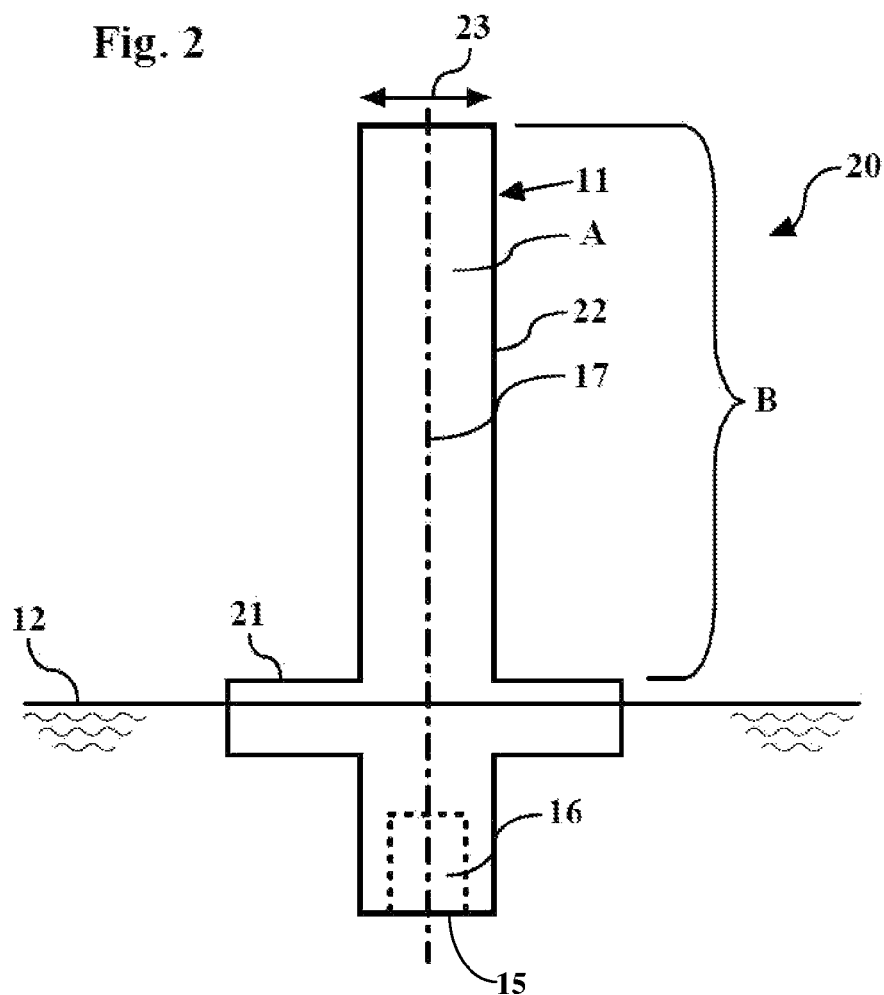
FIG. 2 is a side view of an alternative embodiment of a buoyant motivational object having an additional support body.
Figure 2A:
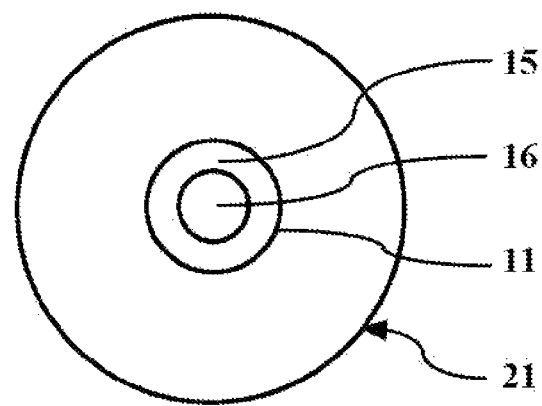
FIG. 2a a bottom view of the motivational object in FIG. 2.

The embodiment of a buoyant motivational object according to FIG. 2 also consists of a cylindrical base body (11) which incorporates a ballast body (16) on one end (15). This rubber based motivational object (20) however is integrally combined with a circular-shaped support body (21) located in perpendicular direction to the longitudinal axis (17) of the base body (11).

The appropriate matching of material densities and geometries of the base body (11), the support body (21) and the ballast body (16) allows the motivational object to assume a position where its longitudinal axis (17) rests in direction perpendicular to that of the surface layer of the water (12) as shown in FIG. 2. The radially outward-extending support body (21) stabilizes extreme pendulum movements around the longitudinal axis (17) (see arrow 23) and its additional flotation surface helps to lift the grasping area (B) further above the surface of the water. Both the visibility and the flotation characteristic of the motivational device have improved. The above-water section of the device in FIG. 2 has increased significantly when compared to the basic version shown in FIG. 1.

The FIGS. 3 and 3a show an alternative motivational object (30) implementation example, with a base body (11) that incorporates a concentrically running longitudinal bore (31, not shown in detail for purposes of clarity) which runs from the lower end (15) to the opposite end of the base body (11). A rope (32) with a knot (33) on each end is fitted through the bore (31)

One from the lower end (15) of the base body (11) extending section (34) of the rope (32) is attached to a spherical body (35) through a bore where the rope (32) is mounted. The inside of the spherical body (35) contains a cylindrically shaped ballast body (16) that also contains a bore for the rope (32). The ballast body (16) could be made of steel which could be embedded in a spherical body (35) made of rubber. The motivational object (30) per FIG. 3 is equipped with a disc-shaped support body (21) to achieve optimal flotation characteristics.

While the implementations of the invention shown in FIGS. 2 and 3 are made of a base body (11) and support body (21) that are integrally combined, FIG. 4 shows alternative implementation of a motivational object (40) where base body (11) and support body (21) are made of two separate components. The surface of the base body (11) is threaded (41) over its entire length. These threads are complementary to the threads in a centric bore in the support body (21) allowing base body (11) and support body (21) to be screwed together. The support body (21) shifts (in direction of the double arrow, 43) along the longitudinal axis of the cylindrical base body (11) when it is turned in direction of the double arrow (42). At its lower end, the base body (11) is also equipped with a ballast body (16). By adjusting the position of the support body (21) relative to the base body (11), flotation characteristics of the motivational object can be modified, i.e., to adjust the motivational object for use in fresh water or salt water (which has higher density). The separate support body (21) which, for example, could be manufactured from polyurethane foam with low density is designed like a clamping-nut that tightly fits onto the matching threads of the base body (11) to prevent unintended twisting or even loss of the support body (21).

Figures 4A, 4B:
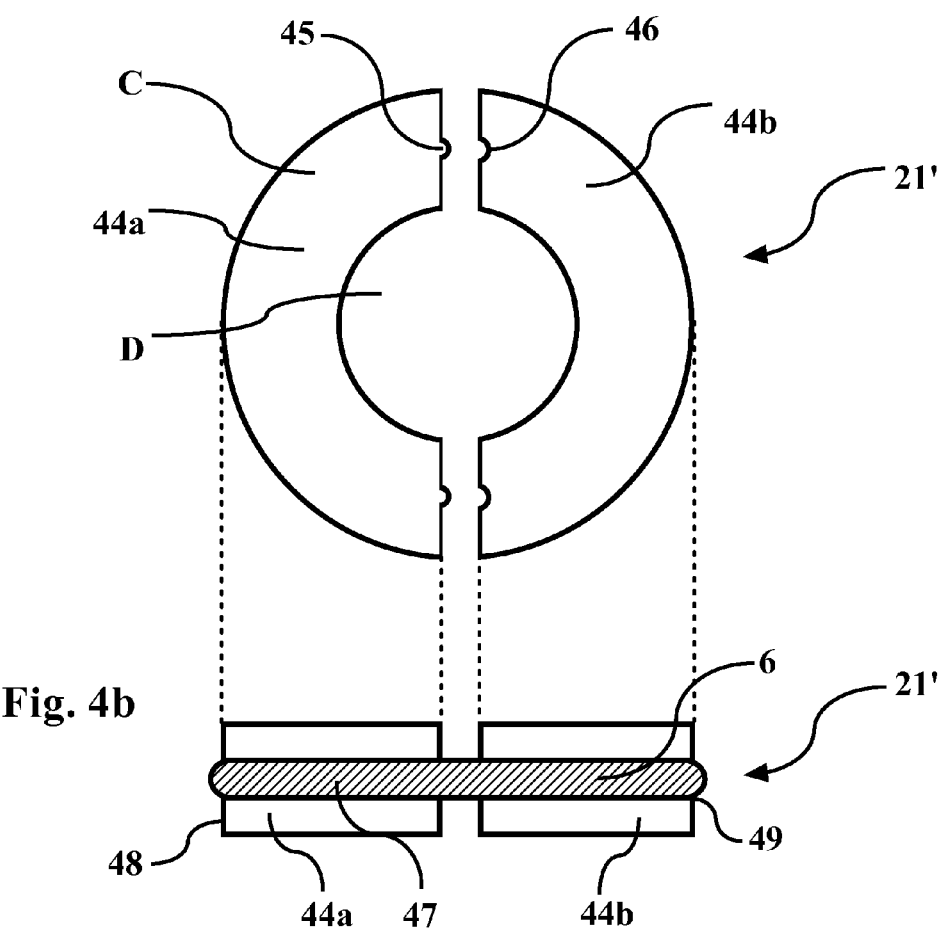

A circular-cylindrical support body (21') shown in FIGS. 4a and 4b could be mounted onto the base body of a motivational object that has a smooth surface without threads. The support body (21') in FIG. 4a consist of two semicircular parts (44a and 44b) that incorporate a matching recess (46) and a ridge (45) on each of two opposing sides to allow for a better interconnection of the two parts. Each ridge (45) tightly fits into its corresponding recess (46) on each of the facial sides of parts 44a and 44b. A connection of the two individual parts (44a and 44b) in both the assembled and unassembled state of the support body (21') is achieved by combining both semicircular parts (44a and 44b) with a rubber band (47) that surrounds the support body (21') on its outer surface (48) tightly fitted into a circular groove (49). In the assembled state of the two semicircular parts (44a and 44b), the diameter of the center opening (D) in the support body (21') is slightly smaller than the outer diameter of the associated base body (11) to ensure that the rubber band (47) always applies a certain amount of force that presses both semicircular parts (44a and 44b) onto the outer surface of the base body (11) and thus holds the support body (21') securely in the selected position.

Another embodiment of a motivational object (50) illustrated in FIG. 5 shows the support body (21) as a single, disk-shaped component with a circular center opening. The outer surface (22) along its longitudinal axis rotationally symmetric base body (11) is wave-shaped with regular intervals of circular wave crests (52) and troughs (51). The inner diameter of the center opening of the support body (21) is in any case smaller than its outer diameter of the base body (11) at the tip of a wave crest (52), possibly even a bit smaller than the outer diameter at the bottom of a wave trough (51). The support body (21) possesses a certain degree of e.g., material based elasticity to allow limited radial expansion which enables it to be pushed over the wave crests (52) and into wave troughs (51) where it "locks" itself into position. As in other embodiments, a ballast body (16) is included in underwater section (13). The water surface (12), above water section (14) and gripping area B are also shown. Distance (18) of the above water section and height point (19) are also shown.

Figures 6, 7:
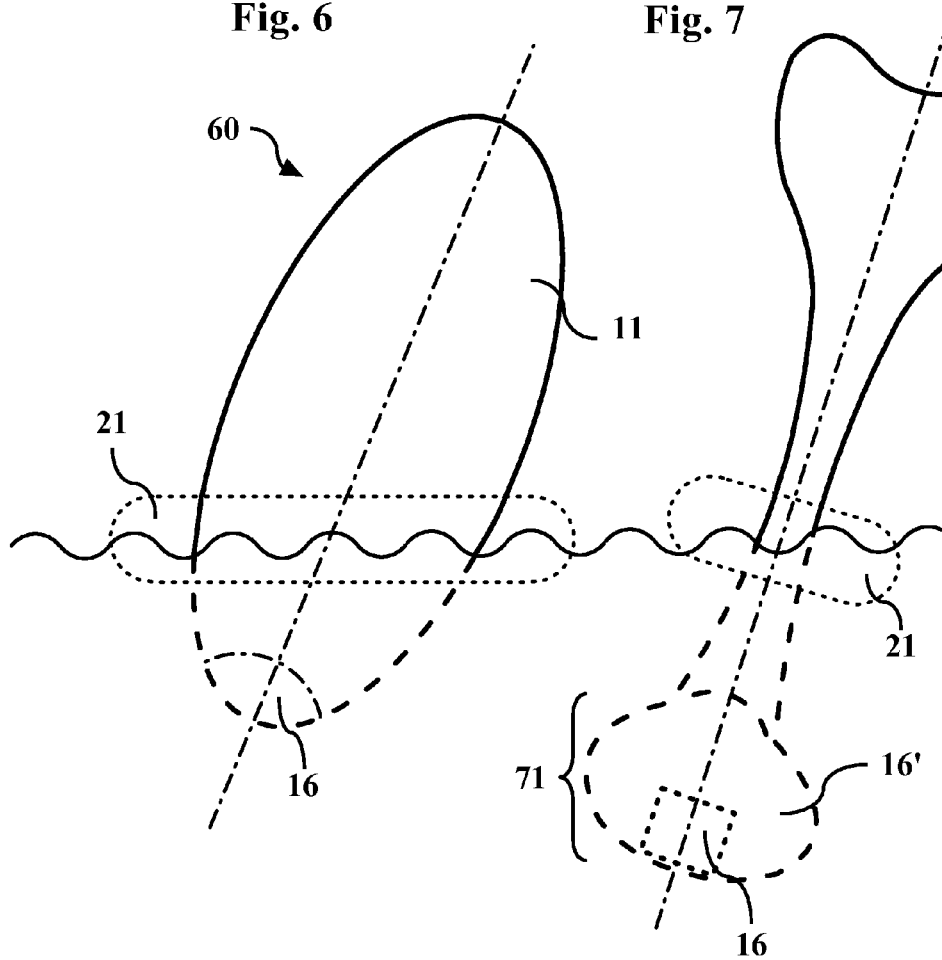
FIG. 6 is a side view of another embodiment featuring an ellipsoid base body.
FIG. 7 is a side view of another embodiment featuring bone-shaped base body.

In the design illustrated in FIG. 6, object (60) the base body (11) is shaped as a hollow ellipsoid with an optional, ring-shaped support body (21) which could be integrally combined with the base body (11). The lower end of the base body (11) incorporates a ballast body (16).

Apart from a bone-shaped base body (11) in another example of a motivational object (70) shown in FIG. 7, there are wide ranging similarities with the motivational object (60) shown in FIG. 6. The optional support body (21) is also ring-shaped and a ballast body (16) is integrated at the lower end of the base body (11). Alternatively, the bottom area of the "bone" (71) could be thickened or made of higher density material to serve as a ballast body (16') itself.

Figure 8:
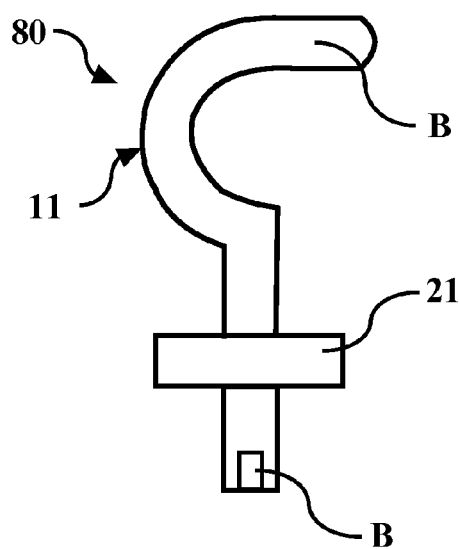
FIG. 8 is a side view of another embodiment featuring a hook-shaped base body.
Figure 10:
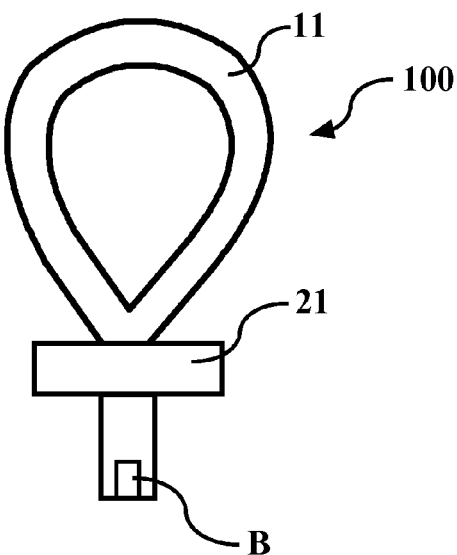
FIG. 10 is a side view of another embodiment featuring a loop-shaped base body.
Figure 9:
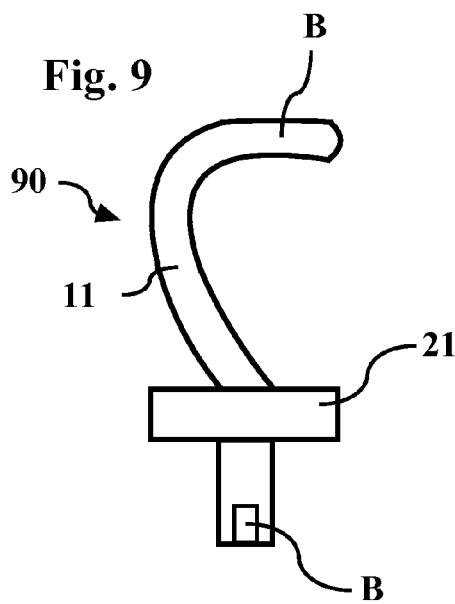
FIG. 9 is a side view of another embodiment of device, having a hook-shaped base body as in FIG. 8.

Other variants of motivational objects (80, 90 and 100) as shown in FIGS. 8, 9, and 10 are designed in the shape of a hook (FIGS. 8 and 9) or in the shape of a loop (FIG. 10). These base bodies (11), all of which provide a grasping area (B) in their above-water section, could be adapted for the most wide ranging requirements.

Figure 11:
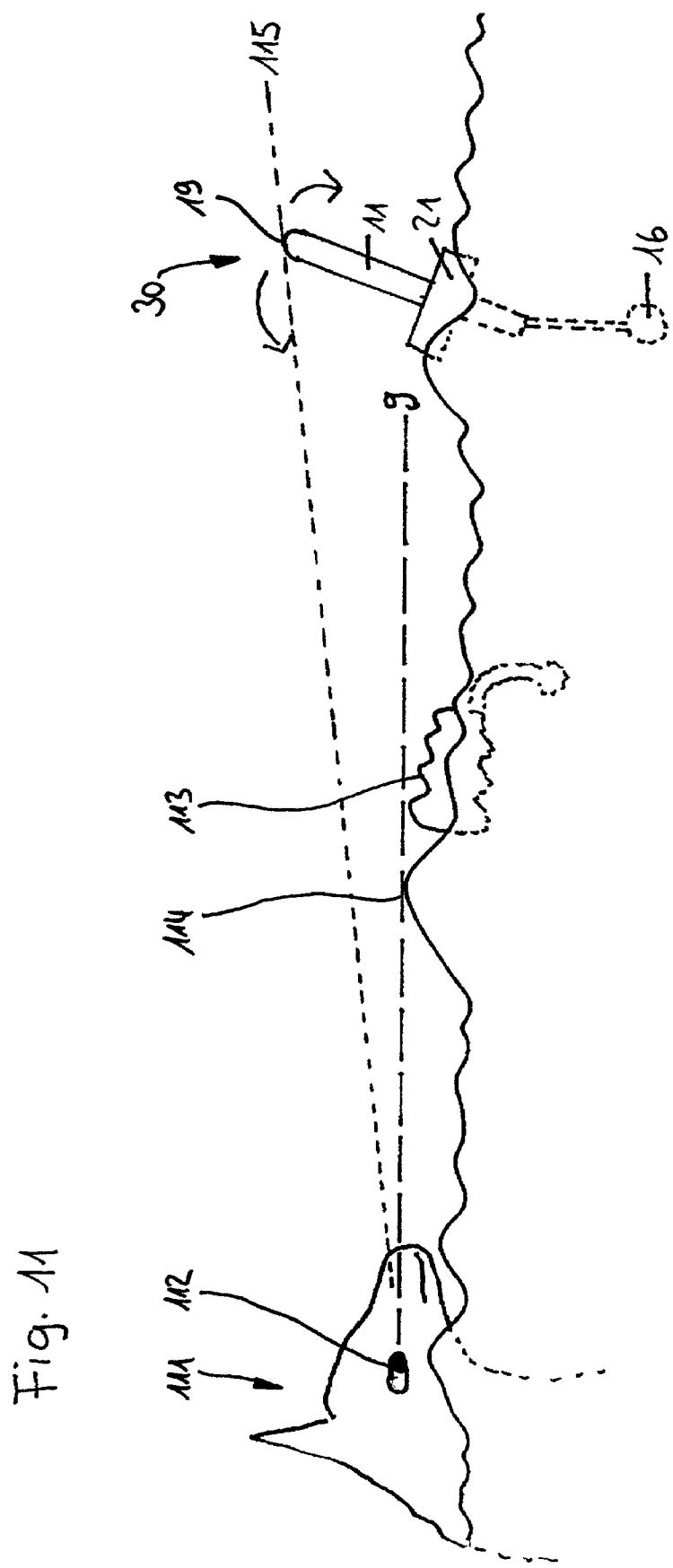
FIG. 11 a schematic representation of the visibility of different buoyant motivational objects or toys from a dog's perspective in the water.

Finally, FIG. 11 illustrates the reduced visibility of a swimming dog (111) whose eyes (112) are only a few centimeters above the surface of the water. A small wave (114) of a few centimeters in height causes the dog (111) to lose eye-contact with a motivational object or floating toy (113) even in close proximity which might result in the loss of the article. In contrast, the motivational object (30) according to the invention with its substantially elevated high-point (19) clearly remains visible (see line of sight 115) even if the wave would be taller, or with the wave in even closer proximity to the dog's head (111). The improved recognizability of the motivational object (30) for the dog (111) is even further enhanced as the above-water section of the base body (11) seesaws back and forth in the water which stimulates a dog's motion-oriented vision.

What is claimed is:

1. A motivational object, the motivational object comprising:
   a base body, the base body being elongated, the based body having a longitudinal axis;
   a ring-shaped support body, the support body being attached to and extending radially outward from the base body generally normal to the longitudinal axis, the support body and the base body in combination having a configuration for flotation on a water, the configuration for flotation providing that the longitudinal axis of the base body is oriented in an upright position with respect to a surface of the water when the base body and support body combination is floating on the water, the base body defining a high point on the longitudinal axis, the base body defining an above water section proximal to the high point, the base body and support body in combination being configured so that the high point and above water section are above the surface of the water when the base body and support body combination are floating on the water, the base body defining a submerged end in a spaced-apart relation to the high point along the longitudinal axis, the base body defining an underwater section proximal to the submerged end when the base body and support body combination is floating on the water, each of the above water section and the underwater section having a length, the length of the above water section being greater than the length of the underwater section;
   said configuration for flotation with the longitudinal axis in an upright position of the base body and the support body in combination comprising:
      the base body and support body in combination defining a density distribution, wherein mean density of the support body is lower than mean density of the elongated base body, and wherein the relative difference in density between the support body and the elongated base body is at least 20%; and,
      the underwater section being configured not to be flooded by water when the base body and support body combination is floating on water;
   a biting area defined by the above water section, the biting area being configured to fit into a muzzle of a dog.

2. The buoyant motivational object of claim 1, wherein the support body is removably attached to the elongated base body.

3. The buoyant motivational object of claim 1, wherein the elongated base body defines a length along the longitudinal axis and a width perpendicular to the longitudinal axis, the length of the elongated base body being at least twice the width of the elongated base body.

4. The buoyant motivational object of claim 1, wherein the elongated base body defines a length along the longitudinal axis and a width perpendicular to the longitudinal axis, the length of the elongated base body being at least thrice the width of the elongated base body.

5. The buoyant motivational object of claim 1, wherein the longitudinal axis is at an angle of at least one of 45 degrees and 60 degrees with the surface of water when the combination of the base body and support body are floating on the water.

6. The buoyant motivational object of claim 1, wherein the high-point on the elongated base body is visible at a height of at least one of 8 centimeters and 10 centimeters above the surface of the water when the combination of the base body and the support body are floating on the water.

7. The buoyant motivational object of claim 1, wherein the support body provides additional righting momentum around a balance point on the elongated base body to stabilize extreme pendulum movements along the longitudinal axis, and enables the high-point to be distinctly recognizable above the surface of water when the combination of the elongated base body and the support body are floating on the water.

8. The buoyant motivational object of claim 1, further comprising a ballast body on a side opposite to the high-point on the elongated base body, wherein the ballast body has a mean density higher than the mean density of the elongated base body.

9. The buoyant motivational object of claim 1, wherein the elongated base body is generally cylindrical shaped.

10. A motivational object, the motivational object comprising:
   a base body, the base body being elongated, the based body having a longitudinal axis;
   a ring-shaped support body, the support body being attached to and extending radially outward from the base body generally normal to the longitudinal axis, the support body and the base body in combination having a configuration for flotation on a water, the configuration for flotation providing that the longitudinal axis of the base body is oriented in an upright position with respect to a surface of the water when the base body and support body combination is floating on the water, the base body defining a high point on the longitudinal axis, the base body defining an above water section proximal to the high point, the base body and support body in combination being configured so that the high point and above water section are above the surface of the water when the base body and support body combination are floating on the water, the base body defining a submerged end in a spaced-apart relation to the high point along the longitudinal axis, the base body defining an underwater section proximal to the submerged end when the base body and support body combination is floating on the water, each of the above water section and the underwater section having a length, the length of the above water section being greater than the length of the underwater section;
   said elongated base body further comprising a ballast body in the submerged end of the elongated base body, wherein the ballast body has a mean density higher than the mean density of the elongated base body;
   said configuration for flotation with the longitudinal axis in an upright position of the base body, the support body and the ballast in combination defining a center of buoyancy, the center of buoyancy being distal to the submerged end; and
   the underwater section being configured not to be flooded by water when the base body and support body combination is floating on water;
   a biting area defined by the above water section, the biting area being configured to fit into a muzzle of a dog.

* * * * *